June 3, 1924.  
G. WILLENS  
SPRING MOTOR  
Filed Nov. 22, 1921  
1,496,572  
3 Sheets-Sheet 1
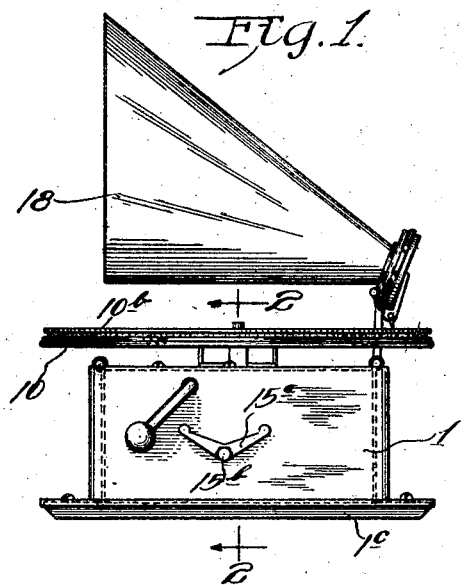
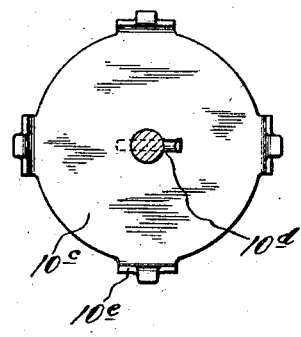
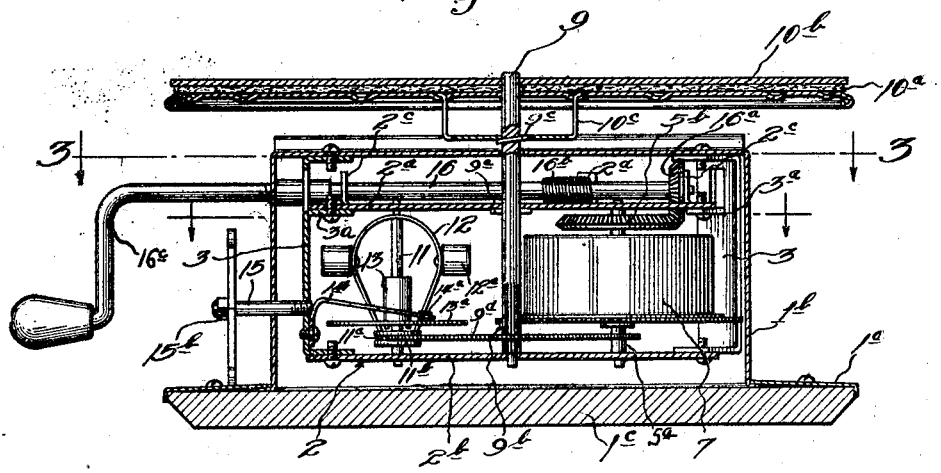
Witness:  
Inventor:  
George Willens,  
by Mason Fenwick Lawrence  
Attys June 3, 1924.
G. WILLENS
SPRING MOTOR
Filed Nov. 22, 1921      3 Sheets-Sheet 2
1,496,572
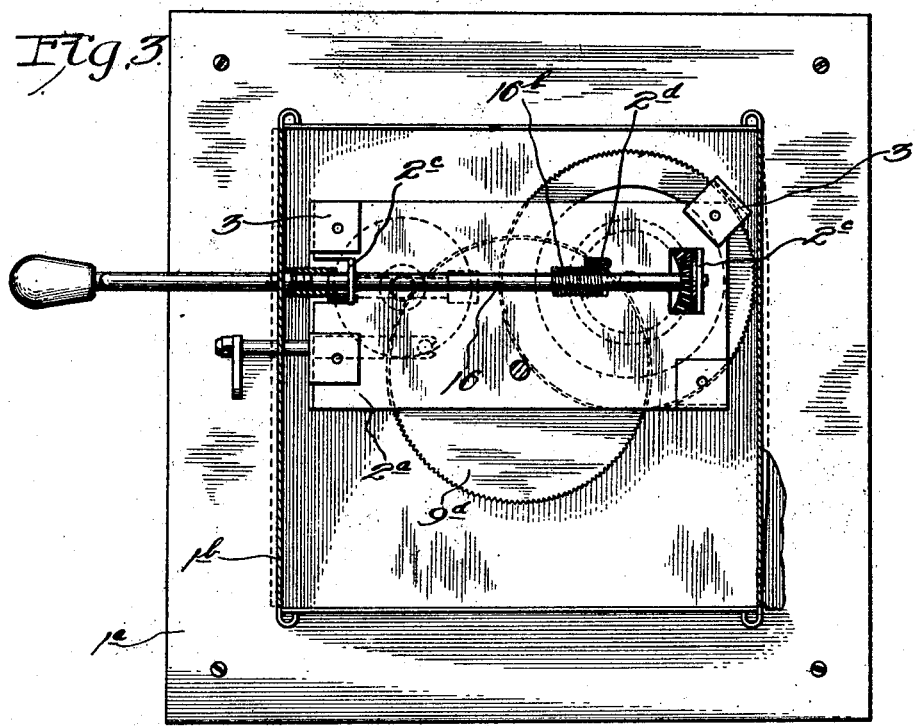
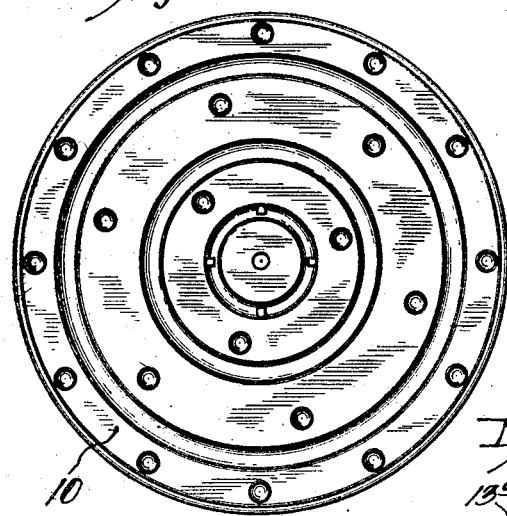
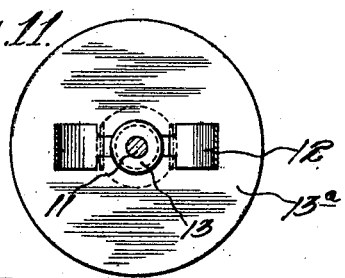
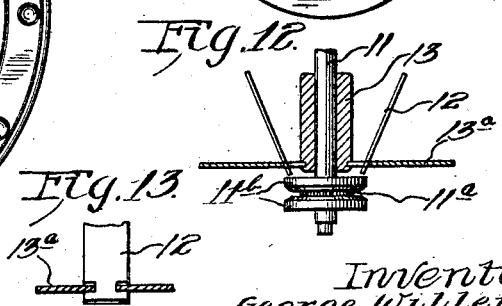
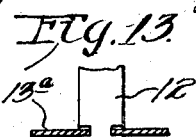
Inventor:
George Willens,
by Mason Fenwick Lawrence
Attys.
Witness:

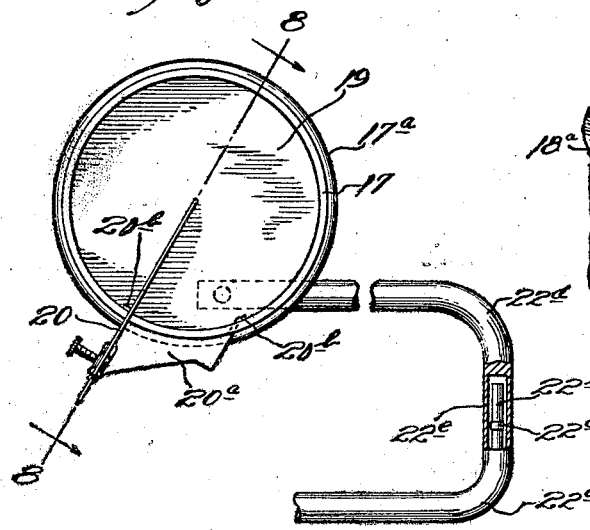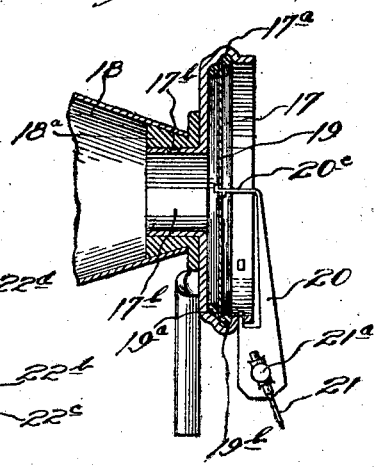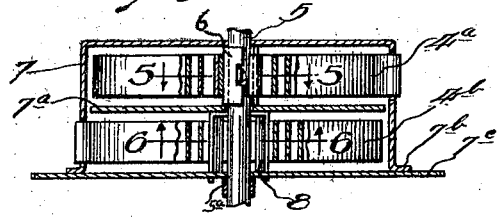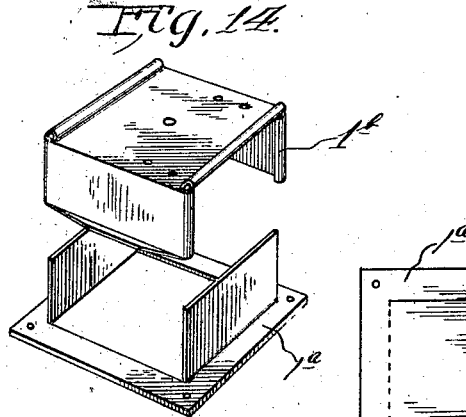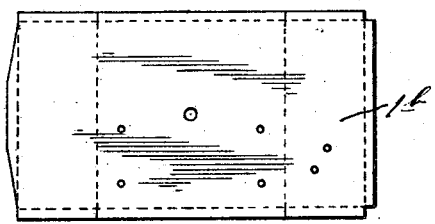

Patented June 3, 1924.

1,496,572

UNITED STATES PATENT OFFICE.

GEORGE WILLENS, OF PADUCAH, KENTUCKY.

SPRING MOTOR.

Application filed November 22, 1921. Serial No. 516,973.

*To all whom it may concern:*

Be it known that GEORGE WILLENS, a citizen of the United States, residing at Paducah, in the county of McCracken and State of Kentucky, has invented certain new and useful Improvements in Spring Motors; and he does hereby declare the following to be a full, clear, and exact description of the invention, such as will enable others skilled in the art to which it appertains to make and use the same.

My present invention relates to spring motors for sound reproducing instrumentalities and relates particularly to portable devices of this kind.

The invention relates particularly to the form and construction of the spring motor case; to the motors for actuating the turntables of said instrumentalities and to the correlation of the several parts of the device, one with another.

These and such other objects as may hereinafter appear are obtained by the novel construction, combination, and arrangement of the parts of my device to be hereinafter specifically described and claimed. Reference will now be had to the accompanying drawings forming a part of this specification, wherein:

Figure 1 is a side elevation of my complete phonograph;

Figure 2 is a vertical section through the case thereof on the line 2—2 of Fig. 1 showing the actuating and governing mechanisms;

Figure 3 is a horizontal section through the case along the line 3—3 of Figure 2 looking in the direction of the arrows;

Figure 4 is a vertical section through the motor and its barrel;

Figure 5 is a detail in horizontal section of the means for fastening the inner end of the upper motor spring;

Figure 6 is a similar view of the anchoring means for the lower spring;

Figure 7 is an end elevation of my reproducer;

Figure 8 is a section on the line 8—8 of Figure 7;

Figure 9 is a top view of the turntable support;

Figure 10 is a similar view of the turntable body;

Figure 11 is a horizontal section through the governor adjacent its base;

Figure 12 is a detail, in a vertical section, of the lower portion of said governor;

Figure 13 is a detail, partly in elevation and partly in section, showing the connection between the governor spring and the brake plate;

Figure 14 is a perspective of the two sections of the mechanism case;

Figure 15 is a plan view of the blank for forming the upper section of said case;

Figure 16 is a similar view of the blank for the other section thereof; and

Figure 17 is a detail of one end of the fastening means employed upon the upper motor spring.

Like reference characters are used to designate similar parts in the several drawings and in the description which follows.

The case.

In the embodiment of my invention herein disclosed and described, a case 1, best shown in Figures 1, 2, 3, and 14, is provided, said case being formed from two sections of sheet material, marked $1^a$ and $1^b$ illustrated as blanks in Figures 15 and 16. Dotted lines upon said blanks represent folds, while full lines indicate cuts through the material.

Blank $1^a$ for the lower section of the case 1 shows a number of spaced screw holes through which screws to firmly secure said section to a wooden base $1^c$ disclosed in Figures 1 and 2, are inserted. As indicated in Figure 14, two of the sides of the case 1 are formed by bending the inner portion of the material of $1^a$ vertically upward.

The blank for the upper section $1^b$ is rectangular in form with the longer edges perpendicularly clipped at the extremities of the transverse folds made to provide the two remaining sides of case 1. Said section $1^b$, when folded, telescopes upon section $1^a$, the four extensions of material upon the sides being curved inwardly a half turn.

The two long narrow extensions of the material of $1^b$ disposed at opposite sides of the top portion of the case 1 are first bent upwardly, then outwardly, and finally under, to provide two substantially cylindrical rolls of material as indicated in Figures 1 and 14. Each extremity of section 1$^b$ has a narrow tongue, both of which are bent outwardly and parallel to the top of case 1. One of these tongues is cut away at its corners, as shown in several views, for ease of assembly.

Preliminary to folding, and preferably concurrently with the stamping out of blank 1$^b$, the apertures, disclosed in Figure 15, for screws and projecting parts, are cut or stamped.

When assembly of case 1 is made, section 1$^b$ is telescoped upon section 1$^a$, (see Figure 14), the tongues upon the former being hooked beneath the latter from the inside. Inward distortion of the sides of section 1$^a$ is prevented by a slight projection of said sides into the rolled material at the side edges of the section 1$^b$, best shown in Figure 1, while outward movement thereof is arrested by engagement with the edges of this same rolled material. A constant cooperative relation exists between 1$^a$ and section 1$^b$ when assembled for, while the sides of the former are made rigid by engagement with the material of section 1$^b$ in the manner just described, the sides of section 1$^b$, by abutment with the vertical edges of the sides of the section 1$^a$, are held against inward displacement. Disposition of the tongues upon section 1$^b$ beneath section 1$^a$ assure contact between the material of said two sections to arrest outward bulging of the sides formed from the material of section 1$^b$.

Additional utility for the rolled material of the top of case 1 will be disclosed later.

The frame or platform.

For disposal of the actuating mechanism of my device within the case 1, I provide a frame or platform 2, clearly illustrated in Figures 2, and 3, said frame comprising upper and lower rectangular, flat, metallic plates, 2$^a$ and 2$^b$, and four vertically disposed spacing members 3. Each spacing member 3 comprises a flat strip of metal of uniform dimensions bent horizontally inward at both extremities and having its material, adjacent to its top end, cut to provide a tongue 3$^a$, also bent horizontally inward.

In assembling the frame 2, plate 2$^a$ is disposed upon the tongues 3$^a$ and secured thereto by screws inserted through said tongues from below; plate 2$^b$ is secured to the lower horizontal portions of the spacing members 3 by screws passing first through said plate 2$^b$ from beneath; and the whole frame or platform is suspended in the case 1 by screws inserted from above through apertures in section 1$^b$ of said case, heretofore described, and into the upper horizontal sections of each of spacing members 3.

The motor.

The actuating means which I employ comprises superposed springs, 4$^a$ and 4$^b$, best depicted in Figure 4. The uppermost of these is engaged with a vertical shaft 5, having its ends journaled in plates 2$^a$ and 2$^b$. For such engagement, I employ an open ring clamping member 6, slightly wider than spring 4$^a$ and which may be readily formed by bending a flat strip of material having a notched or cut out end, such as is shown in Figure 17. Upon said shaft 5 is a swedged ear, slightly narrower than the notch in member 6. When the member 6 is placed upon shaft 5, it substantially surrounds said shaft and the notched end therein engages the swedged ear upon shaft 5 to prevent longitudinal displacement. The inner extremity of the spring 4$^a$ is folded back upon itself to provide a hook into which the opposite end of member 6 is inserted, thus securing a positive but flexible connection between the shaft 5 and spring 4$^a$.

The outer extremity of spring 4$^a$ is secured to a barrel 7 enclosing both springs 4$^a$ and 4$^b$, by again folding the spring 4$^a$ to provide a hook formation, the folded back portion of the extremity being inserted through a slot cut in barrel 7, as is suggested in Figure 4. The spring 4$^a$ is thus secured to the shaft 5 and to the barrel 7 without screws or the weakening effect produced by punching holes in the spring 4$^a$, and this connecting means has the added advantage of permitting slight play between the spring 4$^a$ and shaft 5 without reducing the effectiveness of the connection therebetween.

Interposed between springs 4$^a$ and 4$^b$ is a separator plate 7$^a$, while the barrel 7 which has suitable base flanges 7$^b$, is closed at its lower end by a detached disk-like gear wheel 7$^c$.

The lower spring 4$^b$ is connected at its outer extremity to the barrel 7 in the same manner as spring 4$^a$, the slot to receive the extremity of 4$^b$ preferably being disposed diametrically opposite to that provided for spring 4$^a$. Internally said spring 4$^b$ is secured to a three spoked spider 8, as is shown in Figure 4, by bending a section of the spring 4$^b$ backward around one of the spokes of said spider 8, as indicated in Figure 6.

It will be noted that the spokes of spider 8 pass downwardly through gear wheel 7$^c$. Thus the springs 4$^a$ and 4$^b$ are serially arranged—4$^a$ is wound by the rotation of shaft 5 which passes freely through gear wheel 7$^c$ and spider 8. When spring 4$^a$ is tightly wound by rotated shaft 5, the barrel 7, positioned above gear wheel 7$^c$ and not affixed thereto, will begin to revolve with said shaft 5, winding spring 4$^b$ which is secured at its inner end, as hereinbefore indicated, to the spider 8 affixed to said gear wheel 7ᶜ.

Attention is invited to the fact that spring 4ᵇ is attached at both extremities, as in the case of spring 4ᵃ, without the use of screws or rivets, or the puncturing of the metal.

Springs 4ᵃ and 4ᵇ, as they unwind, actuate the gear wheel 7ᶜ, which causes the turntable, later to be described, to revolve.

The clamping member 6, in addition to securing the spring 4ᵃ to shaft 5, tends to prevent displacements of the barrel 7 and acts as a spacing member between the top of the latter and the separator plate 7ᵃ. A hub about shaft 5 for gear wheel 7ᶜ is formed by spider 8 to which spring 4ᵇ is secured, said spider 8 having the additional function of a spacing member between gear wheel 7ᶜ and separator plate 7ᵃ.

Intermediate gear wheel 7ᶜ and frame member 2ᵇ and upon shaft 5 is a loose collar 5ᵃ which acts as a spacing member between said gear wheel and frame as well as a bearing for the former. The arrangement thus provided insures a certainty of properly spaced relation between the several spring motor parts with a minimum amount of friction therebetween.

The turntable.

This member, designated 10, is disposed, as indicated in Figure 2, upon a shaft 9 journaled at its lower end in plate 2ᵇ, and rotates in circular bearings or apertures in plate 2ᵃ and section 1ᵇ of the case 1. A pin 9ᵃ or collar disposed in or upon shaft 9 just below the point of its engagement with plate 2ᵃ prevents upward displacement of said shaft 9 which, at its lower portion 9ᵇ is fluted to form gear teeth meshing with those of gear wheel 7ᶜ of the spring motor.

At a slight incline from the horizontal, a pin 9ᶜ is driven through the shaft 9 so that each end thereof projects a short distance as is indicated in Figure 2. It is by this pin 9ᶜ that the turntable proper 10 is removably engaged to and upon said shaft 9.

The turntable 10, detailed in Figure 10, comprises a circular disk of suitable metallic material having its edges rolled over and under and a number of concentric rings or ribs and small depressions punched into its surface to aid in securing and maintaining general flatness. Upon this metallic disk 10, a layer of felt 10ᵃ is glued, and upon this latter a record 10ᵇ is placed when it is desired to reproduce the same.

Depending from the center of disk 10 is a spider 10ᶜ comprising, as is shown in Figure 9, a flat central circular portion and multiple radiating arms 10ᵉ having narrow tongues inserted through and clinched upon the disk 10. A key-hole aperture 10ᵈ is cut in the flat portion of spider 10ᶜ, the circular portion of which aperture admits the shaft 9. The vertical sides of the radial portion of said aperture 10ᵈ engage with the upper exposed portion of pin 9ᶜ as the spider 10ᶜ rests upon the lower exposed portion of said pin, thus insuring the revolution of the turntable 10 with the shaft 9 while allowing quick mounting and dismounting of the turntable 10.

The governor.

Having described the turntable of my device and the manner of actuating same, the means for obtaining a uniform and regulated speed of the turntable will now be disclosed, reference being had particularly to Figures 2, 11, 12, and 13.

My governor comprises a shaft 11 journaled in plates 2ᵃ and 2ᵇ upon which and at its upper end, a flexible band of spring metal 12 is keyed at the latter's middle point. Weights 12ᵃ are riveted or otherwise securely fastened to said spring 12.

Mounted for reciprocal movement upon said shaft 11 is a hub or sleeve 13 to the bottom of which is affixed a circular plate or disk 13ᵃ. In the latter, near its center, and diametrically opposed to one another, are two T shaped slots, the narrow portion thereof being pointed toward the circumference of the disk 13ᵃ. The ends of said band 12 are cut away at opposite sides as best illustrated in Figure 13, and when these ends are bent inwardly and inserted through the wide portion of the slots in disk or plate 13ᵃ, they will, upon release, spring outwardly to become securely attached to said plate 13ᵃ.

Shaft 11 is rotated by a train of gears comprising a large toothed disk wheel 9ᵈ upon shaft 9 which wheel meshes with a pinion 11ᵃ disposed upon shaft 11 intermediate two bevel edged guide members 11ᵇ, also secured upon said shaft 11 for rotation therewith.

The centrifugal force exerted by weights 12ᵃ will cause the flexible spring band 12 to spread horizontally, drawing upward as it spreads, the plate 13ᵃ to which it is secured. Therefore, to regulate the unwinding of the spring motor and the speed of the turntable, I provide an L shaped brake member 14, secured to one of uprights 3 by the extremity of its short side, the extremity of the long side of said member 14 being forked to receive and retain a felt shoe 14ᵃ which bears upon the upper surface of disk 13ᵃ adjacent to its circumference.

To regulate the tension of shoe 14ᵃ upon disk 13ᵃ, threaded bolt 15, best inserted through one of the uprights 3 threaded to receive it, is employed. Said bolt 15 is disposed so that its inner end engages the brake member 14 on the latter's short side adjacent its juncture with the long side thereof, so that slight inward movement of the short side produces an exaggerated downward movement of the brake shoe 14ᵃ, on the long side, toward and against the disk 13ᵃ.

At the outer end of said bolt 15, which extends through an aperture in case section 1ᵇ provided therefor, a handle 15ᵃ, comprising two arms at an obtuse angle, is secured by a lock nut 15ᵇ. The speed of the turntable 10 is regulated by rotating inwardly or outwardly the bolt 15. When the correct speed for turntable 10 is obtained, the left hand arm of handle 15ᵃ is locked upon the bolt 15, by tightening nut 15ᵇ, with its end abutting case section 1ᵃ.

The motor is slowed and stopped by rotating the handle 15ᵃ clockwise, the limit of rotation being fixed by the engagement of the right hand arm of 15ᵃ with case section 1ᵃ. To free the motor, the handle 15ᵃ is, of course, revolved in a counter clockwise direction.

The winding mechanism.

For winding the motor, a bevel gear 5ᵇ is keyed to shaft 5. A horizontally disposed winding shaft 16 having a bevel gear 16ᵃ in mesh with gear wheel 5ᵇ is journaled in vertical tongues 2ᶜ formed by bending material cut from plate 2ᵃ as indicated in Figures 2 and 3. The shaft 16 is secured against reversed revolution by a lock spring 16ᵇ anchored to a vertical tongue 2ᵈ also formed from material cut from plate 2ᵃ. It will be noted that the bending of the material of plate 2ᵃ to form the end bearing for shaft 16 provides an aperture through which gear wheel 16ᵃ rotates while in mesh with gear 5ᵇ.

The outer end of shaft 16 which is, substantially, in engagement with case 1, is provided with a sleeve internally threaded to receive a crank 16ᶜ having at its extremity a freely moving grip piece of the usual form. By rotating the crank 16ᶜ in the one direction in which it will turn, it rotates the shaft 16 to wind the spring motor; when force is exerted either by the spring motor or manually to reverse the shaft 16, spring lock 16ᵇ firmly grips the said shaft about its circumference, preventing such displacement.

The reproducer.

The sound reproducing mechanism which I employ is illustrated in Figures 1, 7 and 8. This comprises a cylindrical case 17 having a centrally disposed enlarged ring portion 17ᵃ, one end of said case being open, and the other end being made with an integrally formed apertured plate provided with a centrally disposed reduced cylinder 17ᵇ leading therefrom as the sound passage. To this latter, 17ᵇ, the horn 18 is secured by a rubber washer 18ᵃ, the end sections of which are enlarged as best indicated in Figure 8.

The disk diaphragm 19 is securely mounted in case 17 intermediate an inner rubber ring 19ᵃ engaging the flat end and curved wall of said case, and a larger rubber ring 19ᵇ firmly seated in the enlarged portion, 17ᵃ of said reproducer case.

At the center, the diaphragm 19 is slightly apertured to receive the upper end of stylus 20. This latter comprises a flat vertical portion of greatest width near its bottom, provided with a wing part 20ᵃ fitting snugly about the reproducer case 17, said wing 20ᵃ having bendable end projections 20ᵇ adapted to be inserted through apertures in the wall of reproducer case 17 and bent along the inner periphery thereof. An inwardly pointed section 20ᶜ of said stylus having an upper outer lug and an inner lower lug is inserted into the aperture in said diaphragm so that the vibrations of a needle 21 carried by the stylus 20 are communicated to said diaphragm 19, the diaphragm being moved outwardly by the pull of the upper lug, and inwardly by the push of the lower lug, on section 20ᶜ. As is best shown in Figure 8, the needle 21 is held in a seat in stylus 20 by the thumb screw 21ᵃ. Said needle seat is formed by parallel slitting of the material of stylus 20, bending the portion between the slits, which carries thumb screw 21ᵃ in one direction, and that adjacent to, above and below, said slits in the opposite direction to admit the needle 21 from beneath but to arrest its upward insertion at a point slightly above the upper slit.

The reproducer case 17 is suspended upon the case 1 by a two-piece arm, the under section 22ᵃ being inserted into one of the rolls of material formed at opposite sides of the case section 1ᵇ and heretofore described. Section 22ᵃ at its upper extremity terminates in a reduced portion 22ᵇ about the middle point of which is a cylindrical collar 22ᶜ. The upper section 22ᵈ of the arm is secured to the reproducer case 17 at an angle and at its free end is hollow to form a cylindrical stem 22ᵉ with its wall slightly thickened inwardly at its outer extremity. Section 22ᵉ loosely encloses the reduced portion 22ᵇ of section 22ᵃ. While the two sections 22ᵃ and 22ᵈ are easily separated manually, section 22ᵈ is not prone to be accidentally displaced from section 22ᵃ because of the engagement of the thickened section of stem 22ᵉ with the collar 22ᶜ, the increased friction therebetween being particularly noticed when 22ᵃ and 22ᵈ are separated at a very slight angle.

It will be noted that the under surface of horn 18 is, by the means herein described, held by the angle of the reproducer case 17 so that its lower side is parallel with the turntable 10; also, that the outer end of the horn 18 is cut on a line parallel with the vertical sides of case 1. Additionally, the horn 18 and reproducer case 17 are directly connected and the arm supporting the latter admits of free movement of the stylus 20 about the record without the interposition of the numerous and cumbersome parts ordinarily employed.

What I claim is new and desire to secure by Letters Patent of the United States, is:

1. In a spring motor, a revoluble barrel, a winding shaft, having a swedged ear intermediate its ends, superposed springs within said barrel and connected thereto at their outer extremities, a gear disk mounted for free rotation upon said shaft and to which the lowermost of said springs is connected, and a clamping member comprising a strip of metal recessed at one end and bent to surround said shaft, the uppermost spring being folded back at its inner extremity to hook upon one end of said clamping member, the other and recessed end of said clamping member engaging said swedged ear whereby to prevent accidental linear and rotary displacement of said barrel.

2. In a spring motor structure, the combination of an inner casing and an outer casing, said inner casing comprising an upper and a lower plate, and a plurality of vertically disposed spacing members connecting said plates and projecting above said upper plate for suspending said inner casing from said outer casing, the connection of said upper plate to said spacing members comprising lugs struck out from said spacing members, a spring motor shaft mounted in said plates and provided with a gear, a horizontal winding shaft provided with a gear meshing with the first mentioned gear, locking means for preventing reverse rotation of said winding shaft and lugs struck up from said upper plate and constituting respectively bearings for said winding shaft, and means for holding said locking means in operative position with respect to said winding shaft.

3. The structure as set forth in claim 2, in which the upper plate is disposed between said winding shaft and the gear on said vertical shaft, and the gear on said winding shaft passes through the aperture resulting from striking up of the respective one of the said lugs.

In testimony whereof I affix my signature.

GEORGE WILLENS.